(12) United States Patent
Tong

(10) Patent No.: US 6,624,217 B1
(45) Date of Patent: Sep. 23, 2003

(54) PLANT FIBER COMPOSITE MATERIAL, ITS PRODUCTS AND A PROCESSING METHOD THEREOF

(76) Inventor: Wang You Tong, Building No. 5 177 Huancheng Road East Yichun Municipality, Jiangxi province (CN)

( * ) Notice: Subject to any disclaimer, the term of this patent is extended or adjusted under 35 U.S.C. 154(b) by 0 days.

(21) Appl. No.: 09/540,484

(22) Filed: Mar. 31, 2000

(51) Int. Cl.⁷ .............................................. C08K 11/00
(52) U.S. Cl. .............................. 524/9; 524/13; 524/14; 524/15; 524/16
(58) Field of Search ................................ 524/13, 9, 14, 524/15, 16

(56) References Cited

U.S. PATENT DOCUMENTS

| | | | | |
|---|---|---|---|---|
| 4,222,926 A | * | 9/1980 | Mizuno | ........................ 260/40 |
| 5,354,621 A | | 10/1994 | Liebermann | |
| 5,416,139 A | | 5/1995 | Zeiszler | |
| 5,814,688 A | * | 9/1998 | Hilti | ............................... 524/9 |
| 5,855,832 A | | 1/1999 | Clausi | |
| 6,207,729 B1 | * | 3/2001 | Medoff | ........................ 523/129 |

FOREIGN PATENT DOCUMENTS

| | | |
|---|---|---|
| EP | 0 786 496 A2 | 7/1997 |
| EP | 0 786 496 A3 | 12/1997 |
| GB | 2 278 365 | 11/1994 |

OTHER PUBLICATIONS

Anonymous disclosure No. XP–000772415 entitled Fabrication de pièces moulées à partir de matériaux fibreux.

* cited by examiner

Primary Examiner—Edward J. Cain
(74) Attorney, Agent, or Firm—Davis, Wright, Tremaine

(57) ABSTRACT

There is disclosed a plant fiber composite material that is environmentally benign. There is also disclosed products of the plant fiber composite material, a processing method for the plant fiber composite material, and extruded or molded products using the plant fiber composite material.

21 Claims, 1 Drawing Sheet

PLANT FIBER COMPOSITE MATERIAL, ITS PRODUCTS AND A PROCESSING METHOD THEREOF

TECHNICAL FIELD OF THE INVENTION

This invention relates to a plant fiber composite material, more particularly to an environmentally benign plant fiber composite material. This invention also relates to the products of the composite material and a processing method for the plant fiber composite material and extruded or molded products using the plant fiber composite material.

BACKGROUND OF THE INVENTION

To eliminate "white pollution", substitutes for plastics and foamed plastics have been searched for all over the world, particularly focusing on disposable tableware and products made from plant fiber. At present, there are more than 100 disclosed patent technologies of disposable tableware and products utilizing plant fiber as major raw material in the world such as in the United States, Japan, Germany, Switzerland, Thailand etc, in which more than 60 patent technologies were disclosed in China. However, only a few have commenced commercial production, and the type of products have not been put into market in a large scale for substitution of plastics and foamed plastics. The first reason is the higher cost of the product using plant fiber for raw material, because the plant fiber will result in heavier weight of products, take fast food lunch box for an example, each foamed plastic fast food lunch box only weighs 5 g, each paper lunch box weighs 25 g, and each plant fiber lunch box weighs 50 g, and the cost is greatly decided by the material weight. The second reason is the dark color being disliked or unacceptable by the consumers and the third reason is the poor quality that will result in higher damage rate in transportation or utilization.

However, viewing from current disclosed patent technologies, although the material formulations of various disposable tableware and products and/or appliances are not identical, three processing methods ("slurrying mould", "wet cold pressing" and "Dry hot pressing" technologies) have been adopted predominantly. However, all of the three processing methods are intermittent processes, and are unable to form a continuous streamlined production process.

SUMMARY OF THE INVENTION

One object of the invention is to provide a plant fiber composite material with a biodegradation function, that is an ecological environment protection material.

Another object of the invention is to provide an application of the plant fiber composite material in manufacturing tableware, products, and/or appliances.

A further object of the invention is to provide a processing method of the plant fiber composite material in tableware, products, and/or appliance fabrication, that is a continuous streamlined production process.

The plant fiber composite material of the invention comprises the following components in relative weight parts (by weight in parts):
plant fiber 60–80 parts
polycarbonate resin 5–30 parts
food coloring agent 0–5 parts
wherein the molecular weight of said polycarbonate resin is 8000–35000.

The plant fiber of the invention is obtained from a crop waste, including, but not limited to rice husk, ricegrass, wheat bran, wheat straw, beanstalk, cotton stalk, forage grass, peanut shell, cornstalk, sorghum stalk, bagasse, coconut shell, residue of sugarcane, residue of orange juice, sawed timber bits, bamboo ash and the mixtures thereof. The amount of said plant fiber is preferably in the range of 70 to 80 parts by weight.

Preferably, the polycarbonate resin of the invention is polymerized 2,2' (4 hydroxylphenyl) propane carbonate monomer.

Preferably, the molecular weight of the polycarbonate resin is 10000–15000, and the amount of the polycarbonate resin is in the range of 15 to 20 parts by weight.

The food coloring agent of the invention is selected from the group consisting of titanium white, zinc oxide, iron oxide red, pigment yellow 147, pigment blue 15, and combinations thereof. Preferably, the food coloring agent is titanium white. Preferably, the amount of the food coloring agent is in the range of 4 to 5 parts by weight.

The plant fiber composite material of the invention can further comprises 5–15 weight parts of 4,4'-biphenyl methane diisocyanate (MDI), and preferably 3–5 parts by weight.

The processing method of continuous streamlined production process for production of tableware, products, and/or appliances using plant fiber composite material of the invention comprises the following steps:

1. Place the pulverized plant fiber into the hopper of plant fiber expander, add water corresponding to 10–30% of the plant fiber by weight into the expanding chamber, turn on the expander, and then the plant fiber is expanded and prepared into a powder;

2. Place above expanded plant fiber powder, polycarbonate resin, food coloring agent and/or MDI proportionally into a vertical stirring mixer, thoroughly mix them for 10 min to form a mixture, then add the mixture into a granulator, and the granules of the plant fiber composite material is prepared under 120–200° C.

3. Place above granules into a bunter of the hopper of a twin-screw extruder, control the extrusion processing technologies parameters of the twin-screw extruder as follows to extrude the granules into a sheet continuously:
cylinder temperature 220–250° C.
connector temperature 230–280° C.
die temperature 250–300° C.
extrusion pressure 15–30 Mpa
extrusion speed 1–10 m/min 4. Continuously convey above extruded sheet to a puncher connected with the twin-screw extruder, and then punch and mold the sheet with heated moulds at 150–250° C., 2–50 kg/cm², to obtain the final products.

In the invention, the size of said expanded plant fiber powder is 10–120 mesh, preferably 20–40 mesh, water content of the expanded plant fiber powder is 20–50%, preferably 30%.

Preferably in this invention, the processing technological parameters of extruding the granules of the plant fiber composite material in the twin-screw extruder are as follows:
cylinder temperature 220° C.
connector temperature 230° C.
die temperature 250° C.
extrusion pressure 25 Mpa.

Said extruded sheet is a plate sheet or an open heterotypic sheet.

The invention will be better understood on reading the following detailed description of non-limiting embodiments of the invention with reference to the accompanying drawing.

DETAILED DESCRIPTION OF THE INVENTION

EXAMPLE 1

Preparation of Plant Fiber Composite Granules

Figure 1:
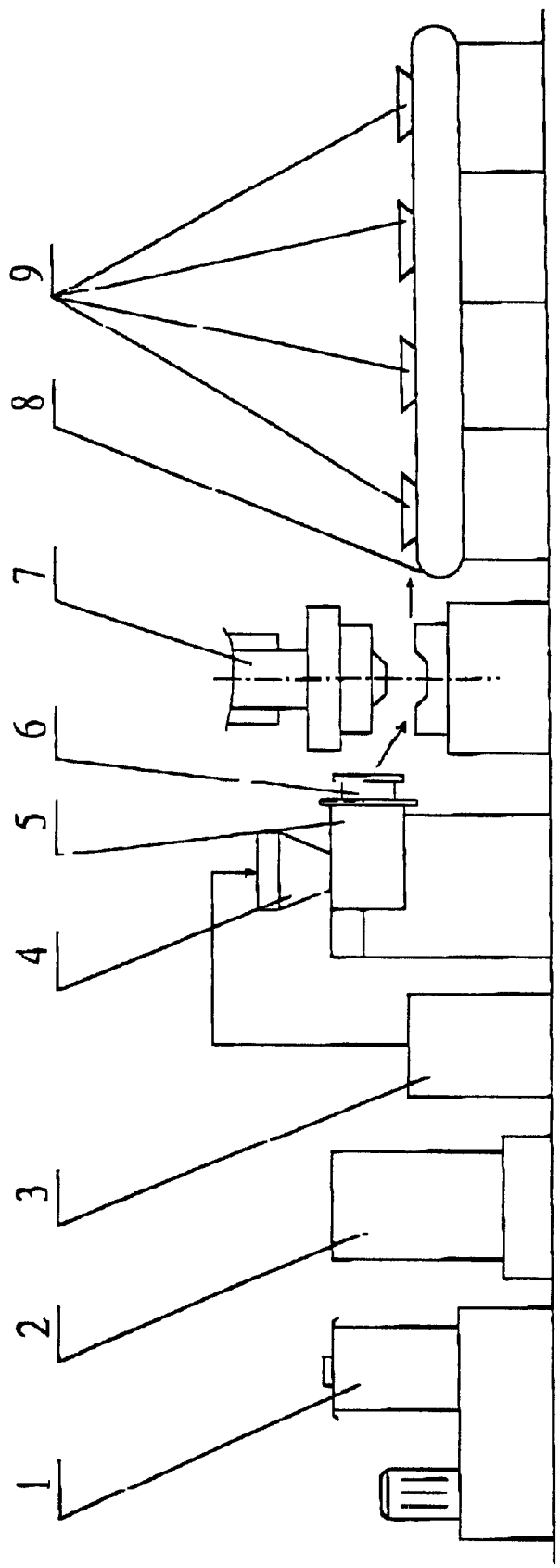
FIG. 1 is a schematic diagram of the continuous streamlined fabrication of crop waste composite material products of the invention.

According to the composition formulation of plant fiber composite material shown as table 1, granulation is conducted on plant fiber composite material of each formulation according to the following steps:

1. Expansion: dry the plant fiber, delivered the dried plant fiber into a DP-120 type Plant fiber expander 1 produced by Shenyang Grain and Oil Machinery Works and expand them to be 20–40 mesh powder having micro holes with water content of 10%.

2. Granulation: place the expanded plant fiber powder, polycarbonate resin (produced by Changzhou Chemical Works), titanium white and/or MDI of said formulation into a conventional vertical stirring mixer 2, thoroughly mixed for about 10 min to form a mixture, then place the mixture into a granulator for granulation at 170° C. to obtain the granules of the fiber composite material having water content 10%.

TABLE 1

| Composition | Formula 1 (kg) | Formula 2 (kg) | Formula 3 (kg) | Formula 4 (kg) | Formula 5 (kg) |
|---|---|---|---|---|---|
| Plant scraps | 20 | 20 | 22.5 | 12.5 | 17.5 |
| Polycarbonate resin | 2.5 | 3.75 | 1.25 | 6.25 | 1.25 |
| Titanium white | 1.25 | 1.25 | | 3.75 | 2.5 |
| MDI | 1.25 | | 1.25 | 2.5 | 3.75 |

EXAMPLE 2

Preparation of the Tableware Using Ulant Fiber Composite Material

Place the granules of the plant fiber composite material of the example 1 into the hopper 4 of a conventional twin-screw extruder 5, and then extrude the granules according to the extrusion technological processing parameters shown in table 2. During the extrusion process, after the granular entering into the cylinder from the hopper 4, under the action of rotary compaction and mixing of the twin-screw 5 at said cylinder temperature, the granules were transformed from a solid state to an uniform continuous melt having a definite flowability, and the uniform continues melt was passed through a perforated plate into a narrow gap die to be molded into a high temperature sheet under the rotary compaction of the twin-screw 5. A puncher 7 having nominal one ton pressure was installed 100 mm ahead of the twin-screw extruder 5 directly, and the upper and lower moulds of which were preheated to 180° C. While the high temperature sheet was pushed to the place between the upper and lower moulds of the puncher 7 by the extruder's head, the upper mould was punched down and the sheet was punched into the required product. Every punching action took about 3 seconds, in which actions of cut-off, side-cut were finished simultaneously. Then, the punched product was carried away by a conveyor belt for shape fixing and cooling.

From the quality and cost of the product, it is concluded that the product of test 1 is preferred.

TABLE 2

| Grouping | Formula | Cylinder temperature (° C.) | Connector temperature (° C.) | Die temperature (° C.) | Extrusion pressure (Mpa) | Extrusion speed (m/min) |
|---|---|---|---|---|---|---|
| Test 1 | Formula 1 | 220 | 230 | 250 | 25 | 2 |
| Test 2 | Formula 3 | 227.5 | 242.5 | 262.5 | 25 | 2 |
| Test 3 | Formula 2 | 235 | 255 | 275 | 25 | 2 |
| Test 4 | Formula 5 | 242.5 | 267.5 | 287.5 | 25 | 2 |
| Text 5 | Formula 4 | 250 | 280 | 300 | 25 | 2 |

EXAMPLE 3

Conventional Performance Test of Products of Plant Fiber Composite Material

Sample: Disposable instant noodle bowl produced by the plant fiber composite material of formula 1 of the example 1.

Test standard:

1. GB 5009.60-85: Analysis of sanitary standards of polyethylene, polystyrene, and polypropylene formed products for food packing
2. GB 9683-88: Sanitary standards of composite food packing bags
3. TB/T2611-94: Universal technological conditions of railway fast food lunch box product supply

TABLE 3

| Test items | Measured value | Normalized value |
|---|---|---|
| n-hexane evaporated residue mg/L | 7.2 | $\leq 30$ |
| 4% acetic acid evaporated residue mg/L | 1.7 | $\leq 30$ |
| 65% alcohol evaporated residue mg/L | 6.3 | $\leq 30$ |
| Consumption of potassium permanganate mg/L | 9.0 | $\leq 10$ |
| Heavy metal (account for Pb) mg/L | <1 | $\leq 1$ |
| Loading test (%) | 0.8 | $\leq 5$ |
| Buffet oil decoloring test | Negative | Negative |
| Alcohol decoloring test | Negative | Negative |
| Oil resistant test | No leak | No leak |
| Water resistant test | No leak | No leak |
| Folding test | Qualified | No fracture under 20 foldings |
| Fluorescent test (254 nm and 365 nm) | Qualified | $\leq 5$ cm$^2$/100 cm$^2$ |

As shown in table 3, it was indicated that the conventional performance of the products of the invention could reach the requirements of related test standards. Mention may be made of the product's low evaporated residue of n-hexane, 4% acetic acid and 65% alcohol.

EXAMPLE 4

Biodegradation Test of the Product of Plant Fiber Composite Material

Institution in charge of detection: Chinese Research Academy of Environmental Science, Institute of Solids Testing method: According to the plastic testing method of U.S. ASTM D5338-92 standard of aerobic biodegradation under the condition of controlled composting process, measure the $CO_2$ yield per unit weight of plastic and rice husk tableware sample within an interval time.

Testing model: Select the disposable tableware produced by formula 1 of example 1 as testing group, and degradable PE plastic film, degradable PS plastic tableware as control group.

Testing results: $CO_2$ yield of each gram of disposable tableware in the testing group was 590 mg within 32 days, while $CO_2$ yield of each gram of degradable PE plastic film in the control group was 480 mg after 32 days, and $CO_2$ yield of each gram of degradable PS plastic tableware in the control group was 290 mg in the same period. Consequently, in comparison of above three $CO_2$ yields, it was indicated that the disposable tableware in the testing group had better degradability than the degradable PE plastic film, degradable PS plastic tableware in control group obviously, and meanwhile it could be observed that there were massive white myeotic spots in the tableware sample of the testing group and the toughness of the tableware sample of the testing group was significantly reduced during and after the testing process.

EXAMPLE 5

Acute Toxicity Test of the Products of Plant Fiber Composite Material of the Invention Sample: disposable tableware produced by formula 1 of example 1

Institution in charge of detection: State Environment Protection Administration of China, Beijing Institute of Environmental Medicine Testing standard: refer to the requirements of toxicological detection in "Universal technological conditions of railway fast food lunchbox product supply" (TB/2611-94) in Professional Standard of the Ministry of Railways in the People's Republic of China, in which the sample is pretreated as follows: Weigh 30 g of sample and shear the sample into pieces of 0.5 cm×0.5 cm. Put the sheared pieces into four sorbitic extractors, then respectively add 300 ml of distilled water, 300 ml of 4% acetic acid, 300 ml of 65% alcohol, and 300 ml of n-hexane into each extractor. Heat each extractor to the boiling points of above four solvents and reflux them for 2 hr, in which the extractor containing water and extractor containing 4% acetic acid were put into paraffin bathes, while the extractor containing 65% alcohol and extractor containing n-hexane were put into water bathes). Mix the four reflux liquids uniformly to form a mixture, and then place above mixture into a rotary evaporator and depressurize concentrate it at 70–75° C. to obtain a concentrated liquid. Take 100 ml the concentrated liquid, add 2 g of starch into it, and then heat it to be paste for experimental use.

Testing method: experimental animal is Kunming breed mice weighing 13–22 g each, provided by the Animal Center of Chinese Academy of Medical Sciences.

(1) Trial test: 9 male and female mice randomly divided into three groups separately, 3 mice in each group. Contamination dosages were 20 g/kg, 19 g/kg, 5 g/kg, respectively. The animals were contaminated (dosed) through gastric lavage via mouth.

(2) Formal test: 40 male and female mice were randomly divided into four groups respectively, 10 animals in each group. According to the results of trail test, contamination dosages were 20 g/kg, 10 g/kg, 5 g/kg, and 2.5 g/kg, once contaminated through gastric lavage via mouth. The animals were fasted for 12 hr before gastric lavage. The maximum volume of a dose was 0.4 ml/20 g of body weight. The animals were observed for one week after contamination (dosing) and poisoning symptoms of animals and time of death were recorded. If the $LD_{50}$ was more than 10 g/kg, it need not be calculated. If the $LD_{50}$ was less than 10 g/kg, it was determined through a retest using a probability unit-graph method.

Experimental Results:

(1) Trial test: no death resulted in three dosage groups of male and female animals, and no poisoning symptoms could be seen.

(2) Formal test: no death resulted in four dosage groups of male and female animals, and no poisoning symptoms could be seen.

Measured $LD_{50}$ of delivered samples for detection was more than 20 g/kg.

Results: lethal dose of 50% ($LD_{50}$) of above concentrated liquid was more than 20 g/kg. Thus, according to acute toxicity ($LD_{50}$) grade scale, it belongs to actual non-toxic grade.

Plant fiber composite material of the invention is tasteless, odorless, and nontoxic. It is an ecologically benign environmentally benign plant fiber composite material. The products made with the plant fiber composite material of the invention demonstrated cold-resistance, heat-resistance, acid-resistance, and alkali-resistance. The major advantages of the product are high impact resistance, high durability, small creep, and stable product size. The product can be hydrolyzed and broken easily in long term submergence in water, and can be disintegrated to become a powder under long term embedded underground with no pollution to soil.

In summary, the above embodiments are only for describing the invention but not for limiting the range of the invention. All the changes that do not depart from the spirit of this invention are within the range of this invention.

What is claimed is:

1. A plant fiber composite material, which comprises the following components parts by weight:

plant fiber 60–80 parts polycarbonate resin 5–30 parts food coloring agent 0–5 parts wherein the molecular weight of said polycarbonate resin is 8000–35000.

2. The plant fiber composite material according to claim 1, wherein said plant fiber component is selected from the group consisting of rice husk, ricegrass, wheat bran, wheat straw, bean stalk, cotton stalk, forage grass, peanut shell, corn stalk, sorghum stalk, sugarcane residue, coconut shell, residue of orange juice, sugarcane residue, sawed timber bits, bamboo ash, and mixtures thereof.

3. The plant fiber composite material according to claim 1, wherein the amount of the plant fiber component is in the range of 70 to 80 parts by weight.

4. The plant fiber composite material according to claim 1, wherein said polycarbonate resin is composed of 2,2'-di (4-hydroxylphenyl) propane carbonate monomer.

5. The plant fiber composite material according to claim 1, wherein the amount of the polycarbonate resin s in the range of 15 to 20 parts by weight.

6. The plant fiber composite material according to claim 1, wherein the molecular weight of the polycarbonate resin is 10,000–15,000.

7. The plant fiber composite material according to claim 1, wherein the amount of the food coloring agent is in the range of 2 to 5 parts by weight.

8. The plant fiber composite material according to claim 1, wherein the food coloring agent is selected from the group consisting of titanium white, zinc oxide, iron oxide red, pigment yellow 147, pigment blue 15, and combinations thereof.

9. The plant fiber composite material according to claim 8, wherein the food coloring agent is titanium white.

10. The plant fiber composite material according to claim 1, wherein the composite material further comprises 5–15 weight parts of 4,4'-biphenyl methane diisocyanate.

11. The plant fiber composite material according to claim 10, wherein the amount of 4,4'-biphenyl methane diisocyanate is in the range of 3 to 5 parts by weight.

12. A process for fabricating tableware, products, and appliances using the plant fiber composite material of claim 1, comprising:

(1) placing a plant fiber material into a hopper containing a plant fiber expander chamber, adding water corresponding to 10–30% of the plant fiber material (by weight) into the expander chamber, and turning on the expander, so as to obtain an expanded plant fiber powder;

(2) placing the expanded plant fiber powder, polycarbonate resin, food coloring agent and/or 4,4'-biphenyl methane diisocyanate proportionally into a vertical stirring mixer, thoroughly mixing for 10 min to form a mixture, then adding the mixture into a granulator to prepare plant fiber composite material under 120–200° C. in the form of granules;

(3) placing the granules of plant fiber composite material into a hopper of a twin-screw extruder, controlling the extrusion processing technologies parameters of the twin-screw extruder to extrude the granules into sheet continuously:
cylinder temperature 220–250° C.
connector temperature 230–280° C.
die temperature 250–300° C.
extrusion pressure 15–30 Mpa
extrusion speed 1–10 m/min (4) continuously conveying above extruded sheet to a puncher connected with the twin-screw extruder, and then punching and molding the extruded sheet with heated moulds at 150–250° C., 2–50 kg/cm$^2$, so as to obtain the fabricated or molded products.

13. The process according to claim 12, wherein the size of the expanded plant fiber powder is 10–120 mesh.

14. The process according to claim 13, wherein the size of the expanded plant fiber powder is about 20–40 mesh.

15. The process according to claim 12, wherein the water content of the plant fiber expanded powder is 20–50% (by weight).

16. The process of claim 15 wherein the water content of the plant fiber expanded powder is about 30% (by weight).

17. The processing method according to claim 12, wherein the processing technological parameters of the twin-screw extruder are cylinder temperature is 220° C., connector temperature is 230° C., and die temperature is 250° C., extrusion pressure is 25 Mpa.

18. The processing method according to claim 12, wherein said extruded sheet is a plate sheet or an open heterotypic sheet.

19. The processing method according to claim 12, wherein the moulds temperature of puncher is about 180° C.

20. A method for using a plant fiber composite according to claim 1 for molding or extruding of tableware, products, and/or appliances, comprising:

(1) placing the granules of plant fiber composite material into a hopper of a twin-screw extruder, controlling the extrusion processing technologies parameters of the twin-screw extruder to extrude the granules into sheet continuously:
cylinder temperature 220–250° C.
connector temperature 230–280° C.
die temperature 250–300° C.
extrusion pressure 15–30 Mpa
extrusion speed 1–10 m/min (2) continuously conveying above extruded sheet to a puncher connected with the twin-screw extruder, and then punching and molding the extruded sheet with heated moulds at 150–250° C., 2–50 kg/cm$^2$, so as to obtain the fabricated or molded products.

21. A polymeric tableware product or appliance comprising a plant fiber composite material according to claim 1.

* * * * *